United States Patent
Zhang et al.

(10) Patent No.: US 10,944,549 B2
(45) Date of Patent: Mar. 9, 2021

(54) BLOCKCHAIN-TYPE DATA STORAGE

(71) Applicant: Advanced New Technologies Co., Ltd., Grand Cayman (KY)

(72) Inventors: Yuan Zhang, Hangzhou (CN); Xinying Yang, Hangzhou (CN); Yize Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/815,539

(22) Filed: Mar. 11, 2020

(65) Prior Publication Data

US 2020/0213093 A1    Jul. 2, 2020

Related U.S. Application Data

(63) Continuation of application No. PCT/CN2020/071601, filed on Jan. 11, 2020.

(30) Foreign Application Priority Data

Jun. 20, 2019 (CN) .......................... 201910537650.2

(51) Int. Cl.
*H04L 9/06* (2006.01)
*G06F 16/901* (2019.01)
*G06F 16/9035* (2019.01)

(52) U.S. Cl.
CPC .......... *H04L 9/0643* (2013.01); *G06F 16/901* (2019.01); *G06F 16/9035* (2019.01); *H04L 2209/38* (2013.01)

(58) Field of Classification Search
CPC ............... H04L 9/0643; H04L 2209/38; G06F 16/9035; G06F 16/901
See application file for complete search history.

(56) References Cited

U.S. PATENT DOCUMENTS

| | | | |
|---|---|---|---|
| 2018/0189312 A1 | 7/2018 | Alas et al. | |
| 2019/0132138 A1* | 5/2019 | Finlow-Bates | ......... H04L 63/12 |

(Continued)

FOREIGN PATENT DOCUMENTS

| | | |
|---|---|---|
| CN | 106776785 | 5/2017 |
| CN | 109034851 | 12/2018 |

(Continued)

OTHER PUBLICATIONS

International Search Report and Written Opinion in PCT Appln. No. PCT/CN2020/071601, dated Apr. 13, 2020, 10 pages (full machine translation).

(Continued)

*Primary Examiner* — Meng Li
(74) *Attorney, Agent, or Firm* — Fish & Richardson P.C.

(57) ABSTRACT

This disclosure relates to blockchain-type storage of receipt data. In one aspect, a method includes obtaining a to-be-stored data record including a first service attribute. Execution information of the to-be-stored data record is determined. A previous data record is obtained from a blockchain-type ledger. The previous data record includes a second service attribute that is the same as the first service attribute. Each data block in the blockchain-type ledger includes a block header and a block body. A hash value of the previous data record is determined. A receipt record is generated. The receipt record includes the hash value of the previous data record and the execution information of the to-be-stored data record. The to-be-stored data record and the receipt record are written into a same block body in the blockchain-type ledger.

12 Claims, 4 Drawing Sheets

(56) References Cited

U.S. PATENT DOCUMENTS

| | | | |
|---|---|---|---|
| 2019/0289019 A1* | 9/2019 | Thekadath | ............ H04L 9/3239 |
| 2020/0013050 A1* | 1/2020 | Finlow-Bates | ...... G06Q 20/382 |

FOREIGN PATENT DOCUMENTS

| | | | |
|---|---|---|---|
| CN | 109117097 | 1/2019 | |
| CN | 109117197 | 1/2019 | |
| CN | 109213797 | 1/2019 | |
| CN | 109471905 | 3/2019 | |
| CN | 109634959 | 4/2019 | |
| CN | 109727030 | 5/2019 | |
| CN | 109902071 | 6/2019 | |
| CN | 109902086 | 6/2019 | |
| CN | 109902125 | 6/2019 | |
| CN | 110347679 | 10/2019 | |
| WO | WO-2019153491 A1 * | 8/2019 | ........... H04L 9/3239 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

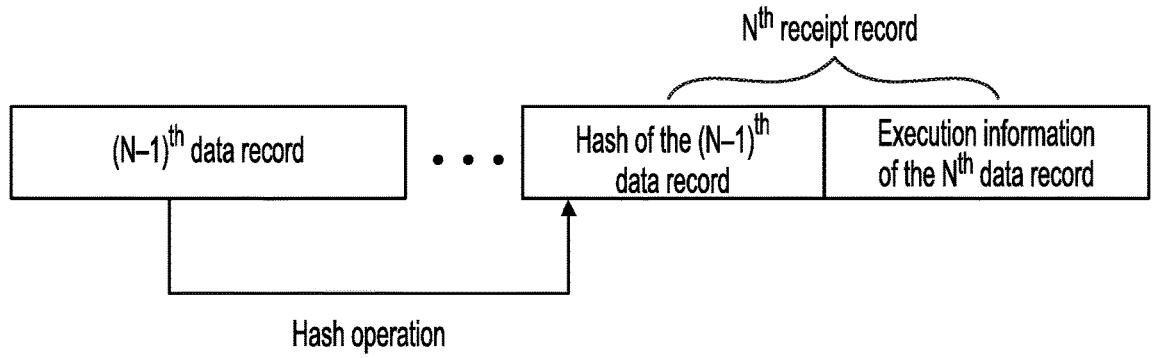

FIG. 3

| | Field Name | Field Type | Field Description |
|---|---|---|---|
| Block header format | Hash | h256 | Hash value of a data block |
| | Version | Uint32_t | Version number |
| | Number | Uint64_t | Block height |
| | Parent_hash | h256 | Hash value of a parent data block |
| | Tx_root | h256 | Root hash of a transacted Merkle tree in a block body |
| | Time_stamp | Uint64_t | Timestamp |

| | Field Name | Field Type | Field Description |
|---|---|---|---|
| Block body format | data_list | STD: vector | Data record list |
| | receipt_list | STD: vector | Receipt record list |

FIG. 4

BLOCKCHAIN-TYPE DATA STORAGE

CROSS-REFERENCE TO RELATED APPLICATIONS

This application is a continuation of PCT Application No. PCT/CN2020/071601, filed on Jan. 11, 2020, which claims priority to Chinese Patent Application No. 201910537650.2, filed on Jun. 20, 2019, and each application is hereby incorporated by reference in its entirety.

TECHNICAL FIELD

Implementations of the present specification relate to the field of information technologies, and in particular, to storage of receipt data.

BACKGROUND

In a blockchain-type ledger that stores data based on a blockchain data structure (e.g., in a form of a blockchain), data records related to the same service attribute (for example, the same user name or the same item name) are distributed in data blocks, correlation and continuity among the data records are difficult to be identified.

As such, there is a need for a data storage solution that can reflect correlations among data records.

SUMMARY

Implementations of the present application aim to provide data storage solutions helping to reflecting a correlation between data.

To alleviate the previous technical problem, the implementations of the present application are implemented as follows:

A receipt data storage method is provided and is applied to a centralized database server that stores data by using a blockchain-type ledger, where a data block in the blockchain-type ledger includes a block header and a block body, and the method includes: obtaining a to-be-stored data record including a service attribute, and determining execution information of the to-be-stored data record; obtaining a previous data record including the same service attribute from the blockchain-type ledger; determining a hash value of the previous data record, and generating a receipt record including the hash value and the execution information; and writing the to-be-stored data record and the receipt record into the same block body in the blockchain-type ledger.

Correspondingly, an implementation of the present specification further provides a receipt data storage apparatus applied to a centralized database server that stores data by using a blockchain-type ledger, where a data block in the blockchain-type ledger includes a block header and a block body, and the apparatus includes: a first obtaining module, configured to: obtain a to-be-stored data record including a service attribute, and determine execution information of the to-be-stored data record; a second obtaining module, configured to obtain a previous data record including the same service attribute from the blockchain-type ledger; a generation module, configured to: determine a hash value of the previous data record, and generate a receipt record including the hash value and the execution information; and a writing module, configured to write the to-be-stored data record and the receipt record into the same block body in the blockchain-type ledger.

In the solutions provided in the implementations of the present specification, when a data record that a user needs to store is received, a hash value of a previous data record having the same service attribute as the to-be-stored data record is obtained based on the service attribute, the hash value of the previous data record is written into a receipt of the to-be-stored data record, and the to-be-stored data record and the receipt are written into the same data block, so as to implement a correlation between data records of the user. Therefore, data chain query or verification can be performed in the stored data block, thereby improving user experience.

It should be understood that the previous general description and the following detailed description are merely examples and explanations, and are not intended to limit the implementations of the present specification.

In addition, any of the implementations in the present specification implementation does not need to achieve all the previous effects.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

FIG. 3 is a schematic diagram illustrating a receipt record generation method, according to an implementation of the present specification;

FIG. 4 is a schematic diagram illustrating formats of a block header and a block body of a data block, according to an implementation of the present specification;

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

Figure 1:
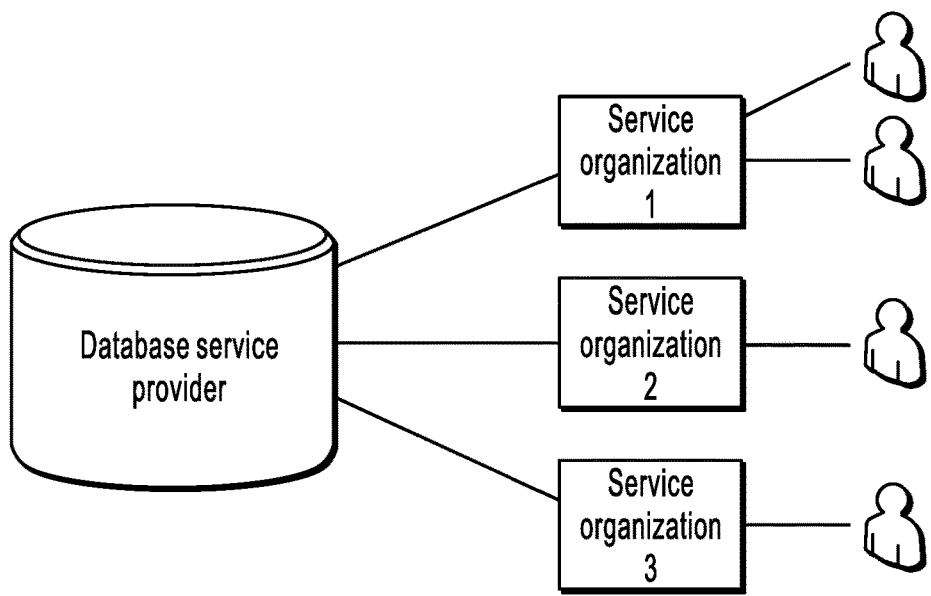
FIG. 1 is a schematic diagram illustrating a system architecture, according to an implementation of the present specification.

In practice, a database server usually interfaces with various organizations, and each organization can record data generated between the database server and a third-party user (including another organization or an individual) in the database server. FIG. 1 is a schematic diagram illustrating a system architecture, according to an implementation of the present specification. In this schematic diagram, one enterprise organization can face a plurality of users, and each user can query the database server by using the enterprise organization corresponding to the user.

For example, the database server interfaces with a financial product company, and a data record can be a financial management record of an individual user in the financial product company; or the database server can interface with a government department, and a data record in the database server is detailed overheads of the government department for a public project managed by the department; or an organization interfaces with the database server is a hospital, and a data record in the database server is a medical record of a patient; or an organization interfaces with the database server is a third-party payment organization, and a data record can be a payment record of an individual user by using the organization.

Data records of a user are usually distributed in a plurality of data blocks. For example, medical records of all patients are sequentially uploaded in a timer order. Therefore, different medical records of the same user may be distributed in different data blocks. Based on this, the implementations of the present specification provide a data storage solution for a blockchain-type ledger, to reflect a correlation between data records.

Figure 2:
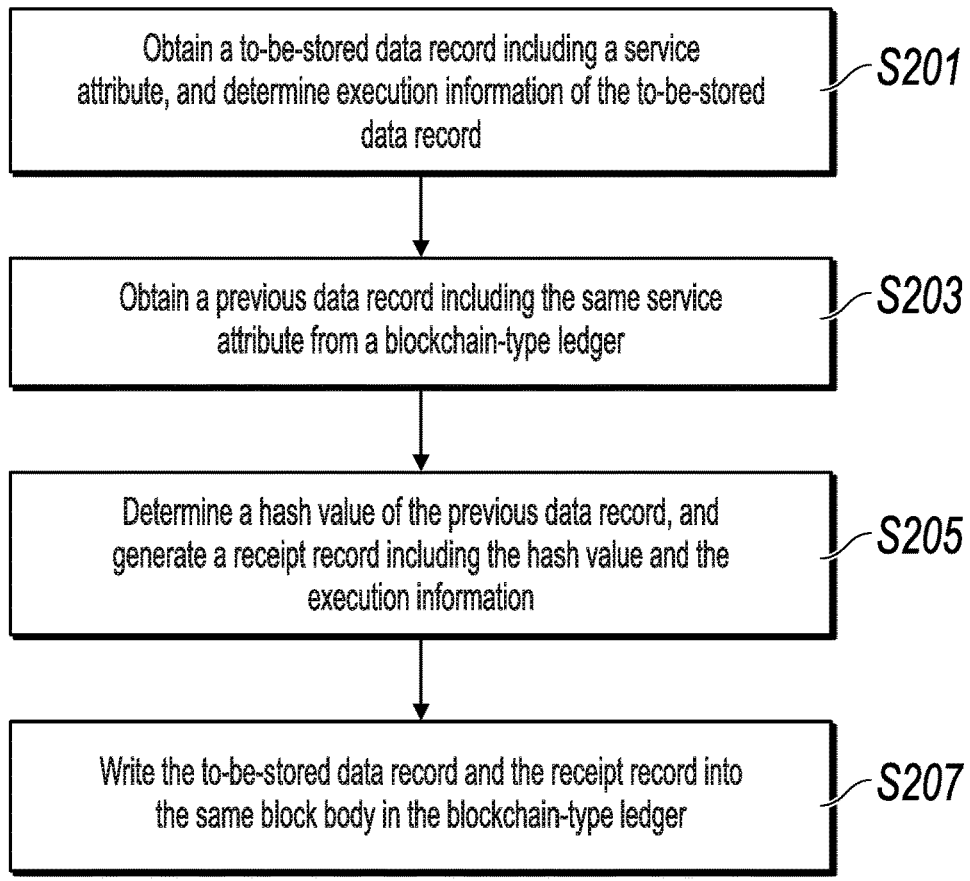
FIG. 2 is a schematic flowchart illustrating a receipt data storage method, according to an implementation of the present specification.

The technical solutions provided in the implementations of the present specification are described below in detail with reference to the accompanying drawings. FIG. 2 is a schematic flowchart illustrating a receipt data storage method, according to an implementation of the present specification. The procedure specifically includes the following steps.

S201. Obtain a to-be-stored data record including a service attribute, and determine execution information of the to-be-stored data record.

In each organization interfaces with a database server, the service attribute usually exists uniquely in the organization that interfaces with the database server. The service attribute can include a user name, a user identity card number, a driver license number, a mobile phone number, a unique item number, etc. in different service scenarios.

For example, a data record in a third-party payment organization is an expense record of a user, and the service attribute in this case is a user identifier (including a mobile phone number, an identity card number, a user name, etc.), or a hash value obtained by performing a hash algorithm on the user identifier. Alternatively, data records in a government organization are overhead records of a plurality of public projects, and the service attribute in this case can be a unique number of each project.

The execution information includes a global sequence number, a timestamp, an execution result, etc. of the to-be-stored data record in the blockchain-type ledger. It is easy to understand that in the centralized database server, a result of data record execution is always successful because no consensus is required for storage.

S203. Obtain a previous data record including the same service attribute from the blockchain-type ledger.

Specifically, the database server can first obtain the service attribute from a specified identifier field in the to-be-stored data record.

A specific location of the specified identifier field and an obtaining method can be negotiated in advance between the database server and organizations interfacing with the database server. For example, when a data record provided by the organization interfacing with the database server is a standard structured data record, the specified identifier field can be obtained from a specified offset in the data record, or a starting location and an ending location are identified by specific character identifiers (for example, the beginning of the service attribute is identified by characters OE, and the end of the service attribute is identified by characters OF). Alternatively, when a data record provided by the organization interfacing with the database server is unstructured data, a header including the service attribute can be directly connected to the beginning of each data record when the data record is updated to the organization interfacing with the database sever, and the database server can directly obtain the service attribute of each data record from the header.

After the service attribute is determined, in a feasible method, the database server can traverse data records in the ledger from the beginning to the end of the ledger, to obtain the previous data record including the same service attribute. Alternatively, in another feasible method, the previous data record including the same service attribute is obtained by querying a pre-established inverted index.

The inverted index includes a mapping relationship between the service attribute and location information, and the location information includes a block height of a data block where a data record is located and an offset of the data record in the data block where the data record is located. A specific method for establishing the inverted index and a specific method for using the inverted index are described below in detail.

The previous data record is a data record most recently recorded on the blockchain-type ledger (that is, a time the latest data block that contains the data record is created). Because both a block height and a block forming time of a data block in the blockchain-type ledger monotonously increases, the previous data record can be a data record located in data block whose block height is the largest.

In addition, it is worthwhile to note that the previous data record can be a stored data record or a to-be-stored data record. After a to-be-stored data record is executed, the server needs to return corresponding execution information to a client. The execution information can be synchronously or asynchronously returned.

S205. Determine a hash value of the previous data record, and generate a receipt record including the hash value and the execution information.

A method for generating the receipt record can be directly connecting the hash value of the previous data record and the to-be-stored data record, for example, placing the hash value of the previous data record at the head or the tail of the receipt record, to obtain the receipt record through connection. FIG. 3 is a schematic diagram illustrating a receipt record generation method, according to an implementation of the present specification. It can be seen from the schematic diagram that the previous data record can be traced back to an original data record based on a Pre-hash (the hash value of the previous data record).

It is worthwhile to note that in some implementations of the present specification, each to-be-stored data record has one corresponding receipt record. In an implementation, a corresponding method can be implemented based on a sequence number. For example, a sequence number of the to-be-stored data record in a data list is the same as a sequence number of the receipt record in a receipt list.

S207. Write the to-be-stored data record and the receipt record into the same block body in the blockchain-type ledger.

In some implementations of the present specification, a data block in the blockchain-type ledger includes a block header and a block body.

The block header is used to store metadata related to the data block. The metadata can include a hash value of a previous data block, a hash value of the data block, a root hash value of a Merkle tree of data records in the data block, a root hash value of a receipt tree in the data block, a version number, etc. The block body can be used to store a data record list, a receipt record list corresponding to the data record list, etc. Data records and receipt records are in a one-to-one mapping relationship in the same block body.

FIG. 4 is a schematic diagram illustrating formats of a block header and a block body of a data block, according to an implementation of the present specification. In the blockchain-type ledger, a format of the data block can be customized based on a user requirement, and is not limited in this solution. For example, in an implementation, the block header of the data block can further include a status array, etc. that describes an operation status of a data record.

Specifically, in the centralized database server that stores data by using the blockchain-type ledger, the data block is generated in the following method: obtaining at least one to-be-stored data record and a corresponding receipt record, and determining a hash value of the to-be-stored data record.

The to-be-stored data record generated by a user can be various expenses records of the individual user of a client, or can be a service result, an intermediate state, an operation record, etc. that is generated by an application server when the application server executes service logic based on an instruction of a user. Specific service scenarios can include an expense record, an audit log, a supply chain, a government supervision record, a medical record, etc.

When a predetermined block forming condition is satisfied, each to-be-stored data record to be written into a data block is determined to generate an $N^{th}$ data block including a hash value of the data block and the to-be-stored data record.

In terms of a finest granularity, one to-be-stored data record can be used to generate one data block. In this method, a relatively high requirement is imposed on both a calculation capability and a storage capability of the server.

A more common application method is storing a plurality of to-be-stored data records in one data block. Therefore, a data block is usually generated based on a predetermined condition, and the predetermined block forming condition includes: a quantity of to-be-stored data records reaches a quantity threshold. For example, a new data block is generated each time one thousand to-be-stored data records are received, and the one thousand to-be-stored data records are written into the block. Alternatively, a time interval from a last block forming moment reaches a time threshold. For example, a new data block is generated every five minutes, and to-be-stored data records received in the five minutes are written into the block.

N here is a sequence number of a data block. In other words, in some implementations of the present specification, data blocks are arranged in a form of a blockchain and in a sequence of block forming times, and have a strong time sequence feature. The block height of the data block is monotonously increased in the sequence of block forming times. A block height can be a sequence number, and in this case, a block height of the $N^{th}$ data block is N.

The block height can be generated in another method. For example, a block forming time of a data block is determined, then the block forming time is converted into integer data by using a symmetric encryption algorithm, and the integer data is used as the block height of the data block. An earlier block forming time indicates smaller integer data. Specifically, the integer here can be large integer data, for example, a large integer of 13 bits. Therefore, because a large integer is obtained based on time symmetric encryption, when a block forming time of a data block is required, the block forming time can be obtained through the same symmetric decryption. For example, a block forming time "20xx-01-19 03:14:07.938576" can be converted into a large integer "1547838847938" after symmetric encryption. Because the integer data is monotonically increased over time, the integer data is "1547838847938". In this case, the integer data can be used as the block height of the data block, and is used to identify the data block.

When N=1, that is, the data block in this case is an initial data block, a hash value and a block height of the initial data block are given based on a predetermined method. For example, if the initial data block includes no data record, the hash value is any given hash value, and the block height blknum=0. For another example, a trigger condition for generating the initial data block is consistent with a trigger condition for another data block, but the hash value of the initial data block is determined by performing hashing on all content in the initial data block.

When N>1, because content and a hash value of a previous data block (namely, an $(N-1)^{th}$ data block) are determined, a hash value of a current data block (the $N^{th}$ data block) can be generated based on the hash value of the previous data block. For example, in a feasible method, a hash value of each to-be-stored data record to be written into the $N^{th}$ block is determined, a Merkle tree is generated in an arrangement order of data records in the block, a root hash value of the Merkel tree is concatenated with the hash value of the previous data block, and the hash value of the current block is generated by using a hash algorithm again. For another example, to-be-stored data records in a block can be connected in a sequence of the to-be-stored data records, and a hash value of an overall data record is obtained by performing hashing on the data records, the hash value of the previous data block is connected with the hash value of the overall data record, and a hash operation is performed on a string obtained through connection to generate a hash value of the data block.

In the previous data block generation method, each data block is determined by using a hash value, and the hash value of the data block is determined by content and a sequence of data records in the data block and a hash value of a previous data block. The user can initiate verification at any time based on the hash value of the data block. Modification to any content in the data block (including modification to the content or the sequence of the data records in the data block) causes inconsistency between a hash value of the data block calculated during verification and a hash value calculated during generation of the data block, leading to a verification failure. As such, immutability of the ledger can be realized under a centralized environment.

After each to-be-stored data record is written into the data block, the database server can return a hash value of the to-be-stored data record generated by the user to the client, so that the client initiates query and verification at any time.

When the user performs query, the user inputs a corresponding hash value to the database server, and the server can return a corresponding to-be-stored data record and a corresponding receipt record to the client, so that the client can obtain the to-be-stored data record generated by the server and the hash value of the previous data record. Further, if necessary, the client can perform further backward query until the first data record that was generated by the client and written into the ledger, to obtain a link of data records based on the service attribute. A principle is similar to this when the client performs verification.

In the solutions provided in the implementations of the present specification, when a data record that a user needs to store is received, a hash value of a previous data record having the same service attribute as the to-be-stored data record is obtained based on the service attribute, the hash value of the previous data record is written into a receipt of the to-be-stored data record, and the to-be-stored data record and the receipt are written into the same data block, so as to implement a correlation between data records of the user. Therefore, data chain query or verification can be performed in the stored data block, thereby improving user experience.

Figure 5:
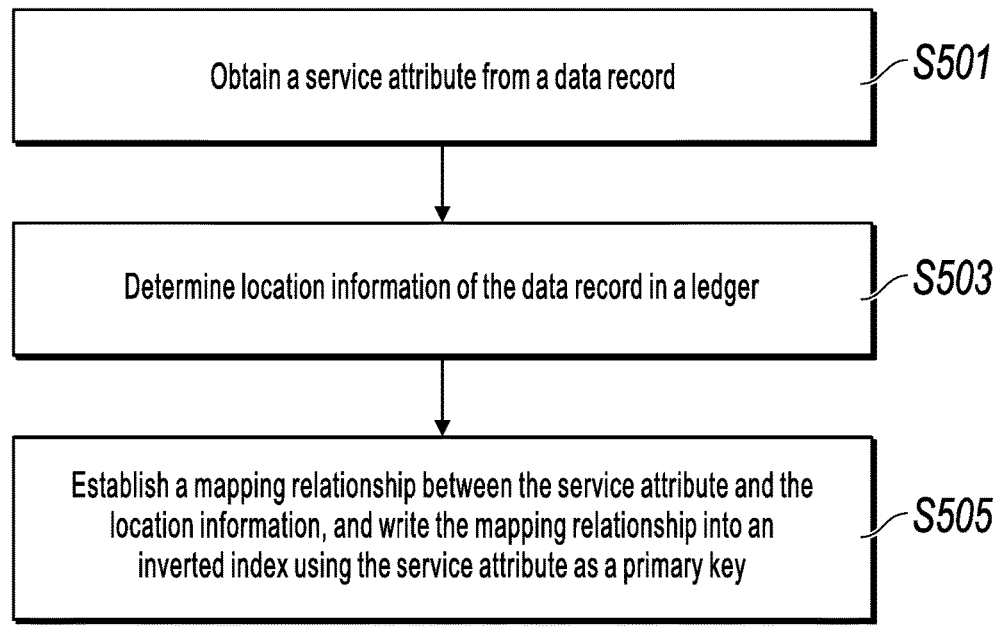
FIG. 5 is a schematic flowchart illustrating a data record index establishment method, according to an implementation of the present specification.

In the implementations of the present specification, to-be-stored data records are usually distributed in a plurality of data blocks. Therefore, after the to-be-stored data records are written into the ledger, a corresponding index can be created for query. Specifically, a method for creating the index is shown in FIG. 5. FIG. 5 is a schematic flowchart illustrating a data record index creation method, according to an implementation of the present specification. The procedure specifically includes the following steps.

S501. Obtain the service attribute from the data record.

A method for obtaining the service attribute from the data record is described above, and details are omitted here for simplicity.

S503. Determine location information of the data record in the ledger.

As described above, one blockchain-type ledger includes a plurality of data blocks, and one data block usually includes a plurality of data records. Therefore, in some implementations of the present specification, the location information is specifically a data block where a data record is located in the ledger when the data block is store and an offset of the data record in the data block.

In the data block provided in some implementations of the present specification, a plurality of methods can be used to identify different data blocks, including a hash value or a block height of the data block.

The hash value of the data block is a hash value obtained by performing hash calculation based on a hash value of a previous block and a data record in the data block, and can be used to uniquely and explicitly identify the data block. In the blockchain-type ledger, a block height of the first data block is usually 0, and the block height is increased by 1 each time one data block is added subsequently. Alternatively, a block forming time of the data block can be converted into a large integer data sequence (which usually includes 12 to 15 bits) monotonously increased, and the large integer data sequence is used as the block height of the data block. Therefore, a data block usually has an explicit block height.

In a determined data block that needs to be written into a database, a sequence of data records in the data block is also fixed. Therefore, a sequence number of a data record in the data block is also explicit. When a length of the data records is a fixed unit, the sequence number can also be used to determine location information of the data record in the data block where the data record is located. To be specific, the sequence number can also be used to indicate the offset.

In addition, because one data block usually includes a plurality of data records, address offsets of the data records in the data block can further be used to separately identify the data records in the data block. Clearly, the address offsets of the data records are different in the same data block.

Certainly, in the method provided in some implementations of the present specification, a specific format of the data block can be customized (for example, metadata information and remark information included in the block header of the data block, or a form of a block height of the data block). Content of the location information is different in different formats, which does not constitute a limitation on this solution.

S505. Establish a mapping relationship between the service attribute and the location information, and write the mapping relationship into the inverted index using the service attribute as a primary key.

In this index, the primary key is the service attribute included in the data record. A specific writing method is as follows: When the primary key in the index does not include the service attribute, an index record using the service attribute as the primary key is created in an index table.

When the primary key in the index includes the service attribute, the location information is written into an index record where the service attribute is located. It is worthwhile to note that writing here is not overwriting. Instead, the location information is added to a value of the index record, and exists in parallel with other location information in the index record.

Table 1 is an example index table, according to an implementation of the present specification. The key is a specific value of the service attribute, and each array in the value part is one piece of location information. A previous part of each array is a block height, and a latter part of the array is a sequence number of a data record in a data block. A data record can be uniquely determined based on the block height and the sequence number. It is easy to understand that in the index table, one key can correspond to a plurality of pieces of location information.

TABLE 1

| Key | Value |
|---|---|
| 0X123456 | (2, 08), (2, 10), (300, 89), (300, 999) |
| 344X0001 | (5, 01), (8, 22) |
| ... | ... |

In the solution provided in some implementations of the present specification, for a data record written into the ledger, a service attribute of the data record and a storage location of the data record in the ledger are determined, a mapping relationship between the service attribute and the storage location is established, and an inverted index using the service attribute as a primary key is created. Therefore, corresponding statistics and subsequent query and verification can be performed on the data record based on the service attribute in the index without knowing service details of the user.

In an implementation, the previous data record including the same service attribute can be obtained by querying the previous index table. For example, if a service attribute in a new to-be-stored record is "344X0001", it can be understood, by querying the table, that heights of blocks where data records corresponding to the service attribute is located are 5 and 8. Therefore, the previous data record can be obtained based on location information (8, 22) corresponding to a maximum value "8" of the block height.

Further, if a plurality of pieces of location information correspond to the maximum value of the block height, location information of the previous data record can be determined based on a value of the offset. For example, if a service attribute in a new to-be-stored record is "0x123456", it can be determined through query that a maximum value of a block height corresponding to the service attribute is 300. If there are two pieces of corresponding location information (300, 89) and (300, 999), the location information (300, 999) can be determined based on a value of the offset to obtain the previous data record.

In an implementation, if corresponding location information cannot be found based on the service attribute in the inverted index, or if a data record including the same service attribute cannot be found by traversing the ledger, it can be determined that the service attribute is written into the ledger for the first time, and in this case, the to-be-stored data record can be determined as the previous data record.

In an implementation, the server can further query data records that have not been stored to obtain the previous data record. For example, the server traverses the data records that have not been written into the data block to obtain one or more to-be-stored data records including the same service attribute, sorts the to-be-stored data records based on timestamps of received the data records, and determines a to-be-stored data record having a closest time interval from the current as the previous data record. Certainly, if the data record including the same service attribute is not found in the data records that have not been written into the data block, the previous data record can be obtained by querying the data block (that is, a stored data block).

Figure 6:
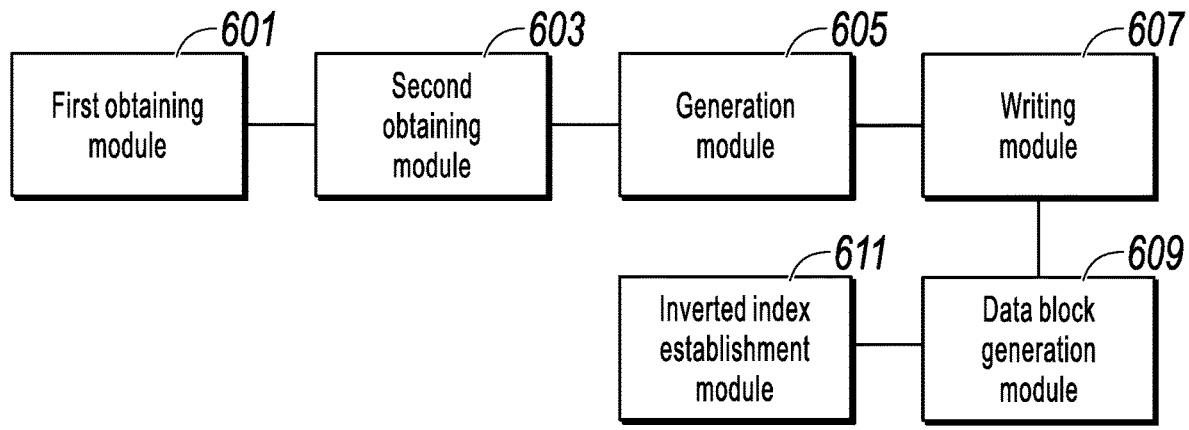
FIG. 6 is a schematic structural diagram illustrating a receipt data storage apparatus, according to an implementation of the present specification.

Correspondingly, an implementation of the present specification further provides a receipt data storage apparatus applied to a centralized database server that stores data by using a blockchain-type ledger. A data block in the blockchain-type ledger includes a block header and a block body. FIG. 6 is a schematic structural diagram illustrating a receipt data storage apparatus, according to an implementation of the present specification, and the apparatus includes: a first obtaining module 601, configured to: obtain a to-be-stored data record including a service attribute, and determine execution information of the to-be-stored data record; a second obtaining module 603, configured to obtain a previous data record including the same service attribute from the blockchain-type ledger; a generation module 605, configured to: determine a hash value of the previous data record, and generate a receipt record including the hash value and the execution information; and a writing module 607, configured to write the to-be-stored data record and the receipt record into the same block body in the blockchain-type ledger.

Further, the second obtaining module 603 is configured to: query a pre-established inverted index to obtain location information corresponding to the service attribute, where the location information includes a block height of a data block where a data record is located and an offset of the data record in the data block where the data record is located; determine a maximum value of the block height in the location information; and obtain the previous data record based on location information corresponding to the maximum value of the block height.

Further, the second obtaining module 603 is configured to determine the to-be-stored data record as the previous data record if the location information corresponding to the service attribute fails to be obtained by querying the inverted index.

Further, the apparatus includes a data block generation module 609, configured to: obtain at least one to-be-stored data record and a corresponding receipt record, and determine a hash value of the to-be-stored data record. When a predetermined block forming condition is satisfied, determining each stored data record and a corresponding receipt record to be written into a data block to generate an $N^{th}$ data block including the hash value of the data block and the data record specifically includes the following: When N=1, a hash value and a block height of an initial data block are given based on a predetermined method; and when N>1, determining a hash value of the $N^{th}$ data block based on each to-be-stored data record and a corresponding receipt record to be written into the data block and a hash value of an $(N-1)^{th}$ data block, writing the hash value of the $N^{th}$ data block into a block header of the $N^{th}$ data block, and writing each to-be-stored data record and the corresponding receipt record into a block body of the $N^{th}$ data block, where a block height of the data block is monotonously increased in a sequence of block forming times.

Further, the predetermined block forming condition includes: a quantity of to-be-stored data records reaches a quantity threshold, or a time interval from a previous block forming moment reaches a time threshold.

Further, the apparatus includes an inverted index establishment module 611, configured to: obtain the service attribute from the to-be-stored data record; determine location information of the data record in the ledger, where the location information includes a block height of a data block where the data record is located and an offset of the data record in the data block where the data record is located; and establish a mapping relationship between the service attribute and the location information, and write the mapping relationship into the inverted index using the service attribute as a primary key.

An implementation of the present specification further provides a computer device. The computer device includes at least a memory, a processor, and a computer program that is stored in the memory and that can run on the processor. When executing the program, the processor performs the data storage method shown in FIG. 2 is implemented.

Figure 7:
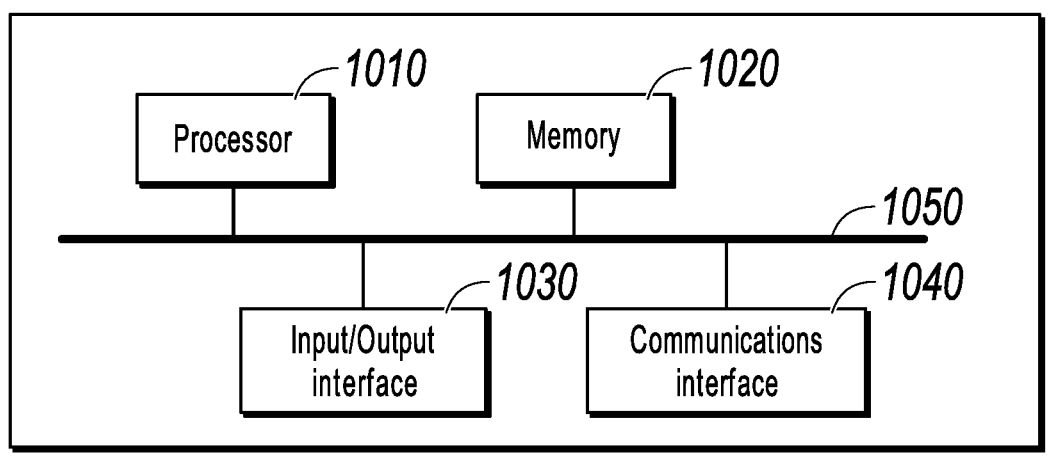
FIG. 7 is a schematic structural diagram illustrating a device used to configure the method in an implementation of the present specification.

FIG. 7 is a schematic structural diagram illustrating a more specific hardware structure of a computing device, according to an implementation of the present specification. The device can include a processor 1010, a memory 1020, an input/output interface 1030, a communications interface 1040, and a bus 1050. A communication connection between the processor 1010, the memory 1020, the input/output interface 1030, and the communications interface 1040 is implemented inside the device by using the bus 1050.

The processor 1010 may be implemented by using a common central processing unit (CPU), a microprocessor, an application specific integrated circuit (ASIC), one or more integrated circuits, etc., and is configured to execute a related program, to implement the technical solutions provided in the implementations of the present specification.

The memory 1020 may be implemented in a form of a read-only memory (ROM), a random access memory (RAM), a static storage device, a dynamic storage device, etc. The memory 1020 may store an operating system and another application program. When the technical solutions provided in the implementations of the present specification are implemented by using software or firmware, related program code is stored in the memory 1020, and is invoked and executed by the processor 1010.

The input/output interface 1030 is configured to connect to the input/output module to input and output information. The input output/module (not shown in the figure) may be configured as a component in the device, or may be externally connected to the device to provide corresponding functions. The input device may include a keyboard, a mouse, a touchscreen, a microphone, various sensors, etc. The output device may include a display, a speaker, a vibrator, an indicator, etc.

The communications interface 1040 is configured to connect to a communications module (not shown in the figure), so as to implement communication and interaction between the device and another device. The communications module may implement communication in a wired method (for example, a USB or a network cable), or may implement communication in a wireless method (for example, a mobile network, WiFi, or Bluetooth).

The bus 1050 includes a channel for transmitting information between components (for example, the processor 1010, the memory 1020, the input/output interface 1030, and the communications interface 1040) of the device.

It should be noted that though the previous device shows only the processor 1010, the memory 1020, the input/output interface 1030, the communications interface 1040, and the bus 1050, in a specific implementation process, the device may further include another component required to implement normal operation. In addition, a person skilled in the art may understand that the previous device may include only components required to implement the solutions in the implementations of the present specification, and does not need to include all the components shown in the figure.

An implementation of the present specification further provides a computer readable storage medium. The computer readable storage medium stores a computer program, and when a processor executes the program, the data storage method shown in FIG. 2 is implemented.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc ready-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, a device implementation is similar to a method implementation, and therefore is described briefly. For a related part, references can be made to some descriptions in the method implementation. The previously described method implementations are merely examples. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present application. It is worthwhile to note that a person of ordinary skill in the art can further make several improvements or polishing without departing from the principle of the implementations of the present application, and the improvements or polishing shall fall within the protection scope of the implementations of the present application.

What is claimed is:

1. A computer-implemented method for receipt data storage, the method comprising:
   obtaining a to-be-stored data record comprising a first service attribute;
   determining execution information of the to-be-stored data record;
   requesting to obtain, from a blockchain-type ledger, a previous data record comprising a second service attribute that is the same as the first service attribute, wherein each data block in the blockchain-type ledger comprises a block header and a block body, wherein requesting to obtain the previous data record comprises:
   querying an inverted index for location information corresponding to the first service attribute, wherein location information corresponding to each service attribute comprises a block height of a data block where a data record comprising the service attribute is located and an offset of the data record in the data block where the data record is located;

determining, based on the querying, that the location information corresponding to the first service attribute is not in the inverted index;

in response to determining that the location information corresponding to the first service attribute is not in the inverted index:

assigning the to-be-stored data record as the previous data record, including assigning the execution information of the to-be-stored data record as execution information of the previous data record;

determining a hash value of the previous data record;

generating a receipt record comprising the hash value of the previous data record and the execution information of the previous data record; and writing the previous data record and the receipt record into a same block body of a particular data block in the blockchain-type ledger.

2. The computer-implemented method of claim 1, further comprising generating the inverted index, the generating including:

obtaining the first service attribute from the to-be-stored data record;

determining location information of the to-be-stored data record in the blockchain-type ledger, wherein the location information of the to-be-stored data record comprises a block height of a data block where the to-be-stored data record is located and an offset of the to-be-stored data record in the data block where the to-be-stored data record is located;

establishing a mapping relationship between the first service attribute and the location information of the to-be-stored data record; and writing the mapping relationship into the inverted index using the first service attribute as a primary key.

3. The computer-implemented method of claim 1, wherein writing the to-be-stored data record and the receipt record into the same block body in the blockchain-type ledger comprises:

obtaining to-be-stored data records including the to-be-stored data record and, for each of the to-be-stored data records, a corresponding receipt record;

determining a hash value of each of the to-be-stored data records; and in response to a predetermined block forming condition is satisfied:

determining one or more to-be-stored data records and a corresponding receipt record for each of the one or more to-be-stored data records to be written into a data block; and generating, as the particular data block, an $N^{th}$ data block comprising a hash value for the data block, wherein N is a sequence number of the Nth data block in a sequence of data blocks, and the generating comprising:

when N=1, generating the Nth data block comprises:

determining the hash value for the Nth data block based on (i) the hash value of each of the one or more to-be-stored data records or (ii) a default hash value; and assigning, as a block height of the Nth data block, an initial block height; and when N>1, generating the Nth data block comprises:

determining the hash value for the $N^{th}$ data block based on the one or more to-be-stored data records and, the corresponding receipt record for each of the one or more to-be-stored data records, and a hash value of an $(N-1)^{th}$ data block;

writing the hash value for the $N^{th}$ data block into a block header of the $N^{th}$ data block; and writing each of the one or more to-be-stored data records and the corresponding receipt record for each of the one or more to-be-stored data records into a block body of the $N^{th}$ data block, wherein the block height of the Nth data block monotonously increases as more blocks are generated.

4. The computer-implemented method of claim 3, wherein the predetermined block forming condition comprises at least one of:

a quantity of to-be-stored data records reaching a quantity threshold; or a time interval from a last block forming moment reaching a time threshold.

5. A non-transitory, computer-readable medium storing one or more instructions executable by a computer system to perform operations comprising:

obtaining a to-be-stored data record comprising a first service attribute;

determining execution information of the to-be-stored data record;

requesting to obtain, from a blockchain-type ledger, a previous data record comprising a second service attribute that is the same as the first service attribute, wherein each data block in the blockchain-type ledger comprises a block header and a block body, wherein requesting to obtain the previous data record comprises:

querying an inverted index for location information corresponding to the first service attribute, wherein location information corresponding to each service attribute comprises a block height of a data block where a data record comprising the service attribute is located and an offset of the data record in the data block where the data record is located;

determining, based on the querying, that the location information corresponding to the first service attribute is not in the inverted index;

in response to determining that the location information corresponding to the first service attribute is not in the inverted index:

assigning the to-be-stored data record as the previous data record, including assigning the execution information of the to-be-stored data record as execution information of the previous data record;

determining a hash value of the previous data record;

generating a receipt record comprising the hash value of the previous data record and the execution information of the previous data record; and writing the previous data record and the receipt record into a same block body of a particular data block in the blockchain-type ledger.

6. The non-transitory, computer-readable medium of claim 5, wherein the operations comprise generating the inverted index, the generating including:

obtaining the first service attribute from the to-be-stored data record;

determining location information of the to-be-stored data record in the blockchain-type ledger, wherein the location information of the to-be-stored data record comprises a block height of a data block where the to-be-stored data record is located and an offset of the to-be-stored data record in the data block where the to-be-stored data record is located;

establishing a mapping relationship between the first service attribute and the location information of the to-be-stored data record; and writing the mapping relationship into the inverted index using the first service attribute as a primary key.

7. The non-transitory, computer-readable medium of claim 5, wherein writing the to-be-stored data record and the receipt record into the same block body in the blockchain-type ledger comprises:

obtaining to-be-stored data records including the to-be-stored data record and, for each of the to-be-stored data records, a corresponding receipt record;

determining a hash value of each of the to-be-stored data records; and in response to a predetermined block forming condition is satisfied:

determining one or more to-be-stored data records and a corresponding receipt record for each of the one or more to-be-stored data records to be written into a data block; and generating, as the particular data block, an $N^{th}$ data block comprising a hash value for the data block, wherein N is a sequence number of the Nth data block in a sequence of data blocks, and the generating comprising:

when N=1, generating the Nth data block comprises:

determining the hash value for the Nth data block based on (i) the hash value of each of the one or more to-be-stored data records or (ii) a default hash value; and assigning, as a block height of the Nth data block, an initial block height; and when N>1, generating the Nth data block comprises:

determining the hash value for the $N^{th}$ data block based on the one or more to-be-stored data records and, the corresponding receipt record for each of the one or more to-be-stored data records, and a hash value of an $(N-1)^{th}$ data block;

writing the hash value for the $N^{th}$ data block into a block header of the $N^{th}$ data block; and writing each of the one or more to-be-stored data records and the corresponding receipt record for each of the one or more to-be-stored data records into a block body of the $N^{th}$ data block, wherein the block height of the Nth data block monotonously increases as more blocks are generated.

8. The non-transitory, computer-readable medium of claim 7, wherein the predetermined block forming condition comprises at least one of:

a quantity of to-be-stored data records reaching a quantity threshold; or a time interval from a last block forming moment reaching a time threshold.

9. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining a to-be-stored data record comprising a first service attribute;

determining execution information of the to-be-stored data record;

requesting to obtain, from a blockchain-type ledger, a previous data record comprising a second service attribute that is the same as the first service attribute, wherein each data block in the blockchain-type ledger comprises a block header and a block body, wherein requesting to obtain the previous data record comprises:

querying an inverted index for location information corresponding to the first service attribute, wherein location information corresponding to each service attribute comprises a block height of a data block where a data record comprising the service attribute is located and an offset of the data record in the data block where the data record is located;

determining, based on the querying, that the location information corresponding to the first service attribute is not in the inverted index;

in response to determining that the location information corresponding to the first service attribute is not in the inverted index:

assigning the to-be-stored data record as the previous data record, including assigning the execution information of the to-be-stored data record as execution information of the previous data record;

determining a hash value of the previous data record;

generating a receipt record comprising the hash value of the previous data record and the execution information of the previous data record; and writing the previous data record and the receipt record into a same block body of a particular data block in the blockchain-type ledger.

10. The computer-implemented system of claim 9, wherein the operations comprise generating the inverted index, the generating including:

obtaining the first service attribute from the to-be-stored data record;

determining location information of the to-be-stored data record in the blockchain-type ledger, wherein the location information of the to-be-stored data record comprises a block height of a data block where the to-be-stored data record is located and an offset of the to-be-stored data record in the data block where the to-be-stored data record is located;

establishing a mapping relationship between the first service attribute and the location information of the to-be-stored data record; and writing the mapping relationship into the inverted index using the first service attribute as a primary key.

11. The computer-implemented system of claim 9, wherein writing the to-be-stored data record and the receipt record into the same block body in the blockchain-type ledger comprises:

obtaining to-be-stored data records including the to-be-stored data record and, for each of the to-be-stored data records, a corresponding receipt record;

determining a hash value of each of the to-be-stored data records; and in response to a predetermined block forming condition is satisfied:

determining one or more to-be-stored data records and a corresponding receipt record for each of the one or more to-be-stored data records to be written into a data block; and generating, as the particular data block, an $N^{th}$ data block comprising a hash value for the data block, wherein N is a sequence number of the Nth data block in a sequence of data blocks, and the generating comprising:
- when N=1, generating the Nth data block comprises:
  - determining the hash value for the Nth data block based on (i) the hash value of each of the one or more to-be-stored data records or (ii) a default hash value; and
  - assigning, as a block height of the Nth data block, an initial block height; and
- when N>1, generating the Nth data block comprises:
  - determining the hash value for the $N^{th}$ data block based on the one or more to-be-stored data records and, the corresponding receipt record for each of the one or more to-be-stored data records, and a hash value of an $(N-1)^{th}$ data block;
  - writing the hash value for the $N^{th}$ data block into a block header of the $N^{th}$ data block; and
  - writing each of the one or more to-be-stored data records and the corresponding receipt record for each of the one or more to-be-stored data records into a block body of the $N^{th}$ data block, wherein the block height of the Nth data block monotonously increases as more blocks are generated.

12. The computer-implemented system of claim 11, wherein the predetermined block forming condition comprises at least one of:
- a quantity of to-be-stored data records reaching a quantity threshold; or
- a time interval from a last block forming moment reaching a time threshold.

* * * * *